United States Patent
Phillips

(10) Patent No.: US 6,435,563 B2
(45) Date of Patent: Aug. 20, 2002

(54) MOUNTING RING FOR WATER CLOSET COUPLING AND METHOD OF INSTALLATION

(75) Inventor: Paul E. Phillips, Erie, PA (US)

(73) Assignee: GPJ Limited, Erie, PA (US)

( * ) Notice: Subject to any disclaimer, the term of this patent is extended or adjusted under 35 U.S.C. 154(b) by 0 days.

(21) Appl. No.: 09/810,309

(22) Filed: Mar. 16, 2001

Related U.S. Application Data

(62) Division of application No. 09/589,943, filed on Jun. 7, 2000, which is a division of application No. 09/004,418, filed on Jan. 8, 1998, now Pat. No. 6,155,606.

(51) Int. Cl.⁷ .......................... F16L 55/00; E03D 11/16
(52) U.S. Cl. ...................... 285/56; 29/402.01; 285/415; 285/15; 4/252.4; 4/252.1
(58) Field of Search ................... 285/56–60, 15–17, 285/415; 29/402.01; 4/252.4, 252.5, 419, 252.6, 252.1

(56) References Cited

U.S. PATENT DOCUMENTS

| | | |
|---|---|---|
| 556,489 A | 3/1896 | Coburn |
| 572,575 A | 12/1896 | Scott |

(List continued on next page.)

OTHER PUBLICATIONS

Catalog by Grabler Manufacturing Co., Cleveland, OH, 5ᵗʰ Issue, 1936.

Primary Examiner—Eric K. Nicholson

(74) Attorney, Agent, or Firm—Edward W. Goebel, Jr.; MacDonald, Illig, Jones & Britton LLP

(57) ABSTRACT

A plastic mounting ring comprises two plastic arcuate members each having a flat upper profile, a flat lower profile and a predetermined thickness. Each plastic arcuate member has a lip extending radially inwardly with an inside diameter that allows it to engage the sides of the channel formed by the flange on the water closet coupling on which it is to be mounted. A corresponding first end of each arcuate member has a notch out of the lower level of its thickness. A second corresponding end of each arcuate member has an extension, coplanar with its flat lower profile, which engages the lower surface of the base of the opposite end of the other arcuate member. The members are fitted together to form a mounting ring having a flat upper profile and a flat lower profile. The mounting ring can be used to replace a flange formation of an installed water closet coupling without removing the total water closet coupling. According to the method, a part of a flange formation is cut away from the installed water closet coupling so that no remaining portion of the installed water closet coupling is wider than the installed connecting pipe. A replacement water closet coupling is provided having a replacement connecting pipe with an inside diameter greater than the outside diameter of the installed connecting pipe to an extent which causes the replacement connecting pipe to fit closely around the installed connecting pipe. A replacement water closet is installed by mounting the replacement connecting pipe around the installed connecting pipe.

4 Claims, 2 Drawing Sheets

U.S. PATENT DOCUMENTS

| | | |
|---|---|---|
| 630,641 A | 8/1899 | Albree |
| 773,734 A | 11/1904 | Griffiths |
| 776,971 A | 12/1904 | Walsh |
| 903,280 A | 11/1908 | Farrell |
| 939,001 A | 11/1909 | Forster |
| 990,646 A | 4/1911 | Fisher |
| 1,019,766 A | 3/1912 | Cronk |
| 1,031,531 A | 7/1912 | Cramer |
| 1,333,368 A | 3/1920 | Auer |
| 1,505,683 A | 8/1924 | Wyatt et al. |
| 1,613,926 A | 1/1927 | Bropson |
| 1,784,667 A | 12/1930 | Gillet |
| 2,082,348 A | 6/1937 | Le Tarte |
| 2,743,460 A | 5/1956 | Youngstrom et al. |
| 2,911,239 A | 11/1959 | Marzolf, Sr. |
| 3,108,818 A | 10/1963 | Furstenburg |
| 3,140,104 A | 7/1964 | Cosper |
| 3,319,268 A | 5/1967 | Blumenkranz |
| 3,761,114 A | 9/1973 | Blakeley |
| 3,775,780 A | 12/1973 | McEwen |
| 3,967,836 A | 7/1976 | Izzi, Sr. |
| 4,352,652 A | 10/1982 | Barber |
| 4,886,302 A | 12/1989 | Forbes |
| 5,153,947 A | 10/1992 | Markles |
| 5,220,694 A | 6/1993 | Knorovsky |
| 5,246,255 A | 9/1993 | Forbes et al. |
| 5,309,579 A | 5/1994 | Nelson |
| 5,314,215 A * | 5/1994 | Weinhold .................. 285/415 |
| 5,335,849 A | 8/1994 | Forbes |
| 5,492,372 A | 2/1996 | Dranberg |
| 5,890,239 A * | 4/1999 | Hite ............................ 285/56 |
| 6,026,521 A * | 2/2000 | Atkins ......................... 285/56 |
| 6,155,606 A * | 12/2000 | Phillips ....................... 285/56 |

\* cited by examiner

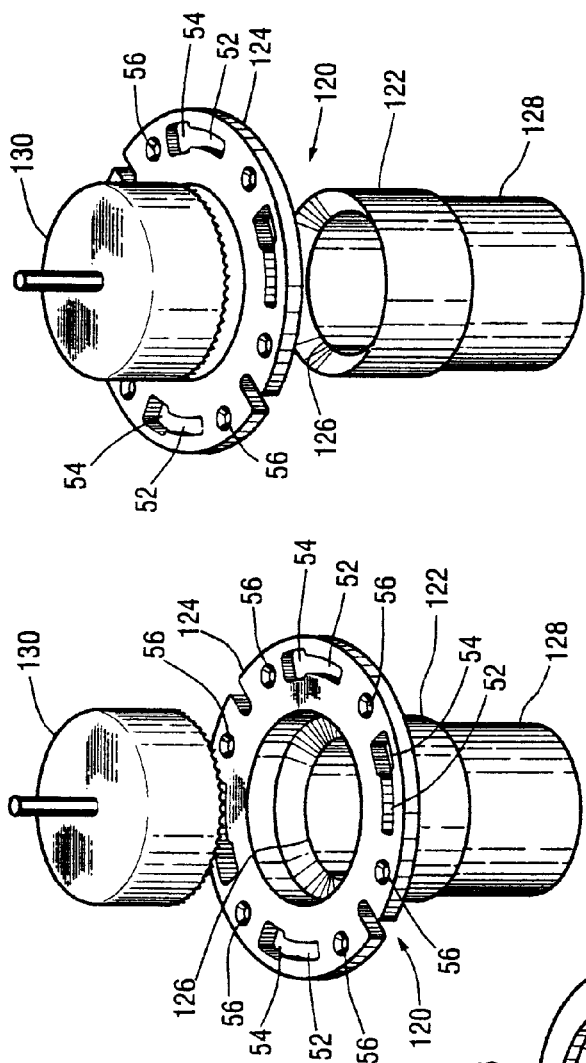
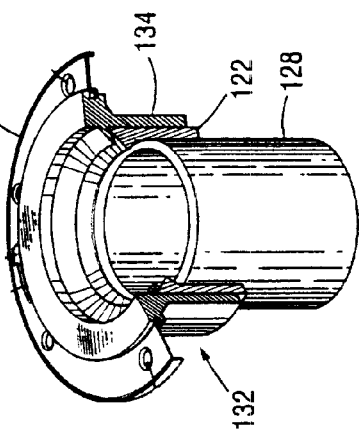
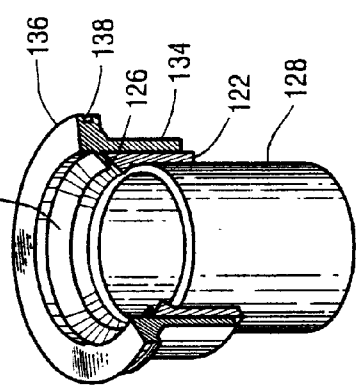
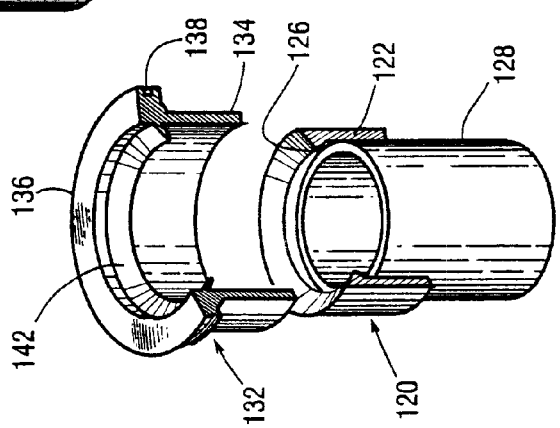

MOUNTING RING FOR WATER CLOSET COUPLING AND METHOD OF INSTALLATION

This application is a division of patent application Ser. No. 09/589,943 filed on Jun. 7, 2000 which is a divisional of application Ser. No. 09/004418 filed Jan. 8, 1998, now U.S. Pat. No. 6,155,606 by the present inventor and entitled Mounting Ring for Water Closet Coupling and Method of Installation which is incorporated herein by reference.

BACKGROUND

This invention relates to couplings for connecting water closet drains to sewer pipes, and more particularly, it relates to a mounting ring which secures the coupling to a water closet and to an adjacent floor when desired.

In recent years plastic water closet couplings have been used to connect the drains of water closets to sewer pipes. These water closet couplings are normally made out of plastic materials such as PVC and ABS. Generally speaking water closet couplings comprise a connecting pipe which is solvent bonded onto the sewer pipe, an extension toward the water closet forming a flange with a radially extending channel near the inlet end of the coupling and a mounting ring retained within the channel. These water closet couplings are normally sold as a single unit which is referred to as a closet flange.

The mounting ring normally has holes in it which enable it to be fastened to the floor, thereby securing the coupling to the floor. The mounting ring also normally has arcuate slots formed within it. After a wax ring is placed about the inlet end of the coupling, the drain of the water closet is set within the coupling so that a base portion of the water closet fits over the mounting ring. The base has holes in it with bolts mounted at positions within the base which enable heads of the bolts to extend through a widened portion of the arcuate slots of the mounting ring. The water closet is rotated slightly to fit the heads of the bolts under the mounting ring. The bolts, when tightened, thus fasten the water closet to the mounting ring and in turn to the floor. Assemblies of this type are shown in U.S. Pat. No. 3,319,268 issued on Mar. 16, 1967 to Blumenkranz and U.S. Pat. No. 3,775,780 issued on Dec. 4, 1973 to McEwen. One such assembly is shown in FIG. 1 and described below.

The load of the water closet is transmitted through the mounting ring. Thus, over a period of time after the installation of a water closet as described above, it is not unusual to find that the mounting ring breaks. This normally occurs in the vicinity of the arcuate slots, where the mounting ring is connected to the water closet. The mounting rings often break due to the stress from the water closet on the mounting ring in the area of the arcuate slots or due to rust or corrosion. As a result, the broken mounting ring has lost its seal and unsanitary liquid leaks from the water closet.

There is a closet flange currently being manufactured and sold which is molded in total as a single piece of plastic material. That is, that closet flange does not have a separate mounting ring installed on it. Rather, the flange portion of the closet flange is extended radially a distance sufficient to include the arcuate slots required to attach a water closet to it and to include the holes in it to be used to fasten the closet flange to the floor. Thus, if the extended flange portion of this closet flange is broken, it normally cannot be readily repaired because the plastic extended flange is integral with the rest of the closet flange. The replacement ring shown in U. S. Pat. No. 5,492,372 issued on Feb. 20, 1996 to Dranberg cannot be installed on it, nor can the mounting rings disclosed and claimed in my U. S. Pat. No. 6,155,606 issued Dec. 5, 2000 or in my co-pending patent application Ser. No. 09/589,943 filed on Jun. 7, 2000.

SUMMARY

In accordance with this invention, a plastic mounting ring comprises two plastic arcuate members each having a flat upper profile, a flat lower profile and a predetermined thickness. Each plastic arcuate member has a lip extending radially inwardly with an inside diameter which allows it to engage the sides of the channel formed by the flange on the water closet coupling on which it is to be mounted. A corresponding first end of each arcuate member has a notch of a pre-selected length and a pre-selected height out of the lower level of its thickness. A second corresponding end of each arcuate member has an extension which is coplanar with its flat lower profile. This extension has a thickness equal to the height of the notch and a length no greater than the length of the notch. This enables the extension on the second end of each arcuate member to fit within the notch on the first end of the other arcuate member to form a plastic mounting ring which has a flat upper profile and a flat lower profile.

In accordance with still another aspect of this invention, a flange formation of an installed water closet coupling, which has its installed connecting pipe attached to a sewer pipe, can be replaced without removing the total water closet coupling. The flange formation is cut away from the installed water closet coupling so that no remaining portion of the installed water closet coupling is wider than the installed connecting pipe. In the preferred embodiment of this invention a circular saw is used for this purpose. Additionally, a replacement water closet coupling is provided having a replacement connecting pipe with an inside diameter greater than the outside diameter of the installed connecting pipe to an extent which causes the replacement connecting pipe to fit closely around the installed connecting pipe. The replacement water closet coupling is installed by mounting the replacement connecting pipe around the installed connecting pipe.

This invention does not reside in any one of the features of the mounting rings and method of installing mounting rings which are disclosed above and in the Detailed Description of the Preferred Embodiments and claimed below. Rather, this invention is distinguished from the prior art by its particular combination of features of the mounting ring and method of installing mounting rings which are disclosed. Important features of this invention have been described to illustrate the best mode contemplated to date for carrying out this invention.

Those skilled in the art will realize that this invention is capable of embodiments which are different from those shown in the details of the mounting ring and method of installing mounting rings and can be changed in various manners without departing from the scope of this invention. Accordingly, the drawings and descriptions are to be regarded as illustrative in nature and are not to restrict the scope of this invention. Thus, the claims are to be regarded as including such equivalent mounting rings and methods of installing mounting rings as to not depart from the spirit and scope of this invention.

BRIEF DESCRIPTION OF DRAWINGS

For a more complete understanding and appreciation of this invention and many of its advantages, reference should be made to the following detailed description taken in conjunction with the accompanying drawings therein:

FIGS. 3A–3E illustrate a method of installing a replacement water closet coupling.

DETAILED DESCRIPTION OF PREFERRED EMBODIMENTS

Figure 1:
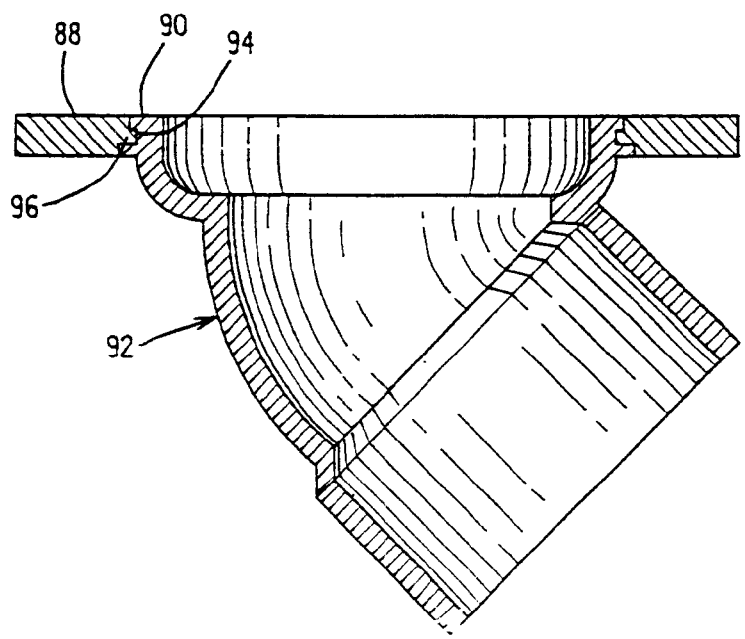
FIG. 1 is a cross-sectional view of a water closet coupling having a solid plastic mounting ring.

Referring to the drawings, identical reference numerals and letters designate the same or corresponding parts throughout the several figures shown.

There are some water closet couplings on the market which use plastic mounting rings. One type of plastic mounting ring being used is a flat mounting ring 88 shown in FIG. 1. The mounting ring 88 is separate from a flange 90 of a water closet coupling 92 and has a lip 96 located at its inside diameter. The flange 90 forms a channel 94 which is engaged by the lip 96. The sizes of the lip 96 and the inside diameter of the mounting ring 88 normally allow the mounting ring 88 to be rotated about the flange 90 so as to properly locate arcuate slots (not shown in FIG. 1) in the proper position for mounting a water closet.

Figure 2:
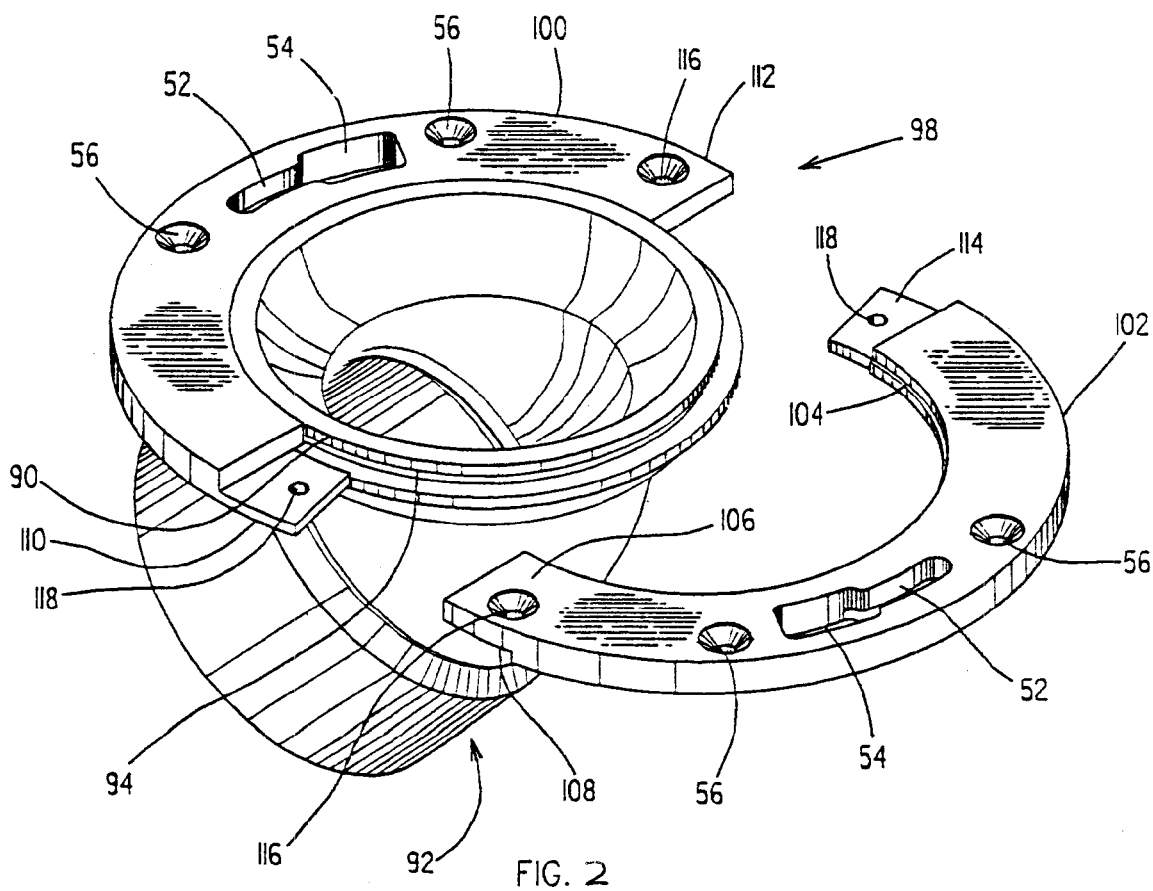
FIG. 2 is a partially exploded, perspective view of a solid plastic mounting ring in accordance with another aspect of this invention, installed as part of a water closet coupling.

In accordance with this invention, and as shown in FIG. 2, mounting ring 98 is provided which comprises a pair of arcuate members 100 and 102. The arcuate members 100 and 102 also have a lip 104 which is located on their inside diameter. The lip 104 engages a channel 94 formed by the flange 90 so as to support the mounting ring 98 on the closet coupling 92. As shown in FIG. 2 the mounting ring 98 has slots 52 with expanded areas 54 for mounting a water closet drain. The mounting ring 98 also has holes 56 for screws to fasten the ring 98 to a floor where a water closet is to be installed. These slots 52, expanded areas 54 and holes 56 can be the same as those used in any other mounting ring.

In further accordance with this invention the arcuate members 100 and 102 form lap joints with one another at the two areas where they meet. The arcuate members 100 and 102 are made of plastic material having a flat upper profile and a flat lower profile. An end 106 of arcuate member 102 has a notch 108 out of the lower level of its thickness. The notch 108 has a predetermined length and a predetermined height. An extension 110 from one end of the arcuate member 100 has a thickness substantially equal to the height of the notch 108 and has a length no greater than the length of the notch 108. This allows the extension 110 to fit within the notch 108, forming a lap joint which maintains the flat upper and lower profiles of the mounting ring. The opposite end 112 of the arcuate member 100 also has a notch (not shown) out of the lower level of its thickness which is identical to notch 108. Similarly, arcuate member 102 has an extension 114 identical to extension 110 located at its end which is opposite from notched end 106. The extension 114 fits into the notch (not shown) in the end 112 to maintain the flat upper and lower profiles of the mounting ring when it is assembled.

Each of the ends 106 and 112 has a hole 116 of sufficient size to receive a bolt or a screw or other fastener used to connect these ends to the extensions 110 and 112, respectively. Similarly, each of the extensions 110 and 114 has a hole 118 in it to receive the fastener through the holes 116. The holes 118 can be tapped, if desired, to retain the threads of a bolt or a screw. Any other arrangement known to those skilled in the art can be used to cause fasteners to hold the lap joints together. It is preferable to removably fasten the ends 106 and 112 to the extensions 110 and 114, respectively, to complete the lap joints which form the mounting ring. However, if desired, the lap joints can be formed by bonding the ends 106 and 112 to the extensions 110 and 114, respectively.

The resulting mounting ring 98 can be easily assembled and installed in the plastic water closet flange 92 initially before the water closet flange 92 itself is installed between a water closet drain and a sewer pipe. The mounting ring 98 can also be installed on the water closet flange 92 as a replacement for a mounting ring which was initially included on the water closet flange. In either event the assembled mounting ring 98 will have not only a structure which allows it to be easily assembled on a water closet coupling, but also a flat profile which allows the ring 98 to form a consistent seal between itself and a wax seal installed between it and a water closet drain.

Alternatively, the arcuate members 100 and 102 could be joined together by making one of the lap joints into a pivot joint. By way of example the outside corner of the end 106 and the outside corner of the extension 110 could be rounded or otherwise cut away. The amount of the material removed from these corners would be sufficient to allow the arcuate members 100 and 102 to pivot away from one another and then toward one another after the end 106 has been attached to extension 100 by a fastener through holes 116 and 118. The plastic mounting ring 98 could then be used in the same manner as the mounting ring 62B shown in FIGS. 9–11 of my U.S. Pat. No. 6,155,606.

There are water closet couplings on the market that are one solid piece of plastic. The mounting ring used for this type of water closet coupling is molded onto the inlet end of the coupling and cannot be rotated except by rotating the water closet coupling itself before it is bonded onto a sewer pipe.

A water closet coupling of this type comprises an installed water closet coupling 120 shown in FIG. 3A. The installed water closet coupling 120 includes a connecting pipe 122 and a flange formation 124 which is integral with the connecting pipe 122. The installed water closet coupling 120 also includes an internal shoulder 126 which is shown more clearly in FIG. 3C.

The flange formation 124 can have the same type of holes 56 used in separable mounting rings for attaching the water closet coupling 120 to flooring in the area where a water closet is to be installed. It can also have slots 52 and expanded areas 54 of the type used in other mounting rings to receive bolts from a water closet. The connecting pipe 122 of the water closet coupling 120 is shown installed on a sewer pipe 128.

As indicated above, the fact that the flange formation 124 is molded as part of the water closet coupling 120 makes the flange formation 124 difficult to repair if it cracks once the water closet coupling 120 is installed on the sewer pipe 128. Prior to this invention there was no alternative to cutting off the water closet coupling 120 of the section of the sewer pipe 128 on which it was installed and installing a new water closet flange on the sewer pipe. This often resulted in a significant amount of work and cost.

A method of replacing a flange formation of an installed water closet coupling is shown in FIGS. 3A–3E. The first act of this method involves cutting the flange formation 124 away from the installed water closet coupling 120 so that no portion of the installed water closet coupling 120 is larger than the installed connecting pipe 122. In the preferred embodiment of this invention, the flange formation is cut through the use of a circular saw 130 which can fit within the inside diameter of the flange formation 124. The flange formation 124 is then cut from the top of the installed connecting pipe 122 as shown in FIG. 3B. The objective is to remove the flange formation 124 in such a way that no remaining portion of the installed water closet coupling 120 is wider than the installed connecting pipe 122. Where plastic material extends outside the installed connecting pipe 122 after the flange formation 124 has been removed, a file or other appropriate tool may have to be used to remove the excess plastic material.

Next, a replacement water closet coupling 132 must be provided which has a replacement connecting pipe 134 with an inside diameter greater than the outside diameter of the installed connecting pipe 122. See FIGS. 3C and 3D. The inside diameter of the replacement connecting pipe 134 should be slightly greater than the outside diameter of the connecting pipe 122 so that the replacement connecting pipe 134 fits closely around the installed connecting pipe 122.

The replacement water closet coupling 132 can be of any design which is desired by those skilled in the art. The replacement water closet coupling 132 shown in FIG. 3C has a flange 136 about the circumference of its inlet end. The flange 136 forms a slot 138 which extends around the full circumference of the replacement water closet coupling 132. A mounting ring of any convenient design could be included in the slot 138. See mounting ring 140 shown in FIG. 3E by way of example. The replacement water closet coupling 132 can also have an internal shoulder 142 which can rest on the top of the remaining portion of the installed water closet coupling 120, formed about its internal circumference.

The replacement water closet coupling 132 is installed over the water closet coupling 120 by installing a replacement connecting pipe 132 around the installed connecting pipe 122. See FIGS. 3D and 3E. Normally, bonding material such as PVC Cement, manufactured by Oatey, 4700 W. 160 St., Cleveland, Ohio 44135, would be painted on either the inside surface of the replacement connecting pipe 134 or on the outside surface of the installed connecting pipe 122. This would then bond the replacement water closet coupling 132 to the installed water closet coupling 120.

If a mounting ring such as the mounting ring 62 shown in FIG. 3 of my U.S. Pat. No. 6,155,606 was used as the mounting ring 140, it could be added to the replacement water closet coupling 132 before the installation or at the end of the installation of this coupling as shown in FIG. 3E.

The method of the invention can also be used, if desired, to remove from a water closet coupling a flange of the type which has a mounting ring on it.

Those skilled in the art will recognize that many modifications can be made to this invention without departing from its spirit and scope. Thus, the appended claims are intended to be interpreted to cover such equivalents which do not depart from the spirit and scope of this invention.

What is claimed is:

1. A plastic mounting ring for use with a water closet coupling which can be interposed between a water closet drain and a sewer pipe, the water closet coupling having a flange near its inlet end which forms a radially extending channel that retains said mounting ring, said plastic mounting ring comprising:

(a) two plastic arcuate members each having a predetermined thickness, a flat upper profile, a flat lower profile, a corresponding first end and a corresponding second end; a lip located on the inside of the arc of each arcuate member, said lip extending radially inwardly with an inside diameter which allows said lip to engage sides of the channel formed by the flange so that each arcuate member can be retained on the coupling;

(b) said first end of each arcuate member having a notch of a pre-selected length and a pre-selected height out of a lower portion of its thickness;

(c) said second end of each arcuate member including an extension having one side which is coplanar with said flat lower profile of said arcuate members, said second end having a thickness substantially equal to the pre-selected height of said notch and a length no greater than the pre-selected length of said notch so that the extension can be fitted into the notch to enable said two arcuate members to be fitted together to form said plastic mounting ring;

(d) each of said arcuate members having a slot for connecting said mounting ring to the water closet; and (e) each of said arcuate members having holes for connecting said mounting ring to a floor.

2. A method of replacing a flange formation of an installed water closet coupling having an installed circular connecting pipe attached to a sewer pipe and a flange formation extending radially outside the installed connecting pipe at the inlet of the installed water closet coupling, the method comprising:

(a) cutting the flange formation away from the installed water closet coupling so that no remaining portion of the installed water closet flange is wider than the installed connecting pipe;

(b) providing a replacement water closet coupling having a replacement connecting pipe with an inside diameter greater than the outside diameter of the installed connecting pipe of the installed water closet coupling to an extent which causes the replacement connecting pipe to fit closely around the installed connecting pipe; and (c) installing the replacement connecting pipe of the replacement water closet coupling around the installed connecting pipe.

3. A method of replacing a flange formation of an installed water closet coupling according to claim 2 in which the act of cutting the flange formation away from the water closet coupling is performed using a circular saw.

4. A method of replacing a plastic flange formation of an installed water closet coupling having an installed circular connecting pipe attached to a sewer pipe and a flange formation extending radially outside the installed connecting pipe at the inlet of the installed water closet coupling, the method comprising:

(a) cutting the plastic flange formation away from the installed water closet coupling with a circular saw so that no remaining portion of the installed water closet flange is wider than the installed connecting pipe;

(b) providing a replacement water closet coupling having a flange near its inlet end which forms a radially extending slot for a mounting ring and having a replacement connecting pipe with an inside diameter greater than the outside diameter of the installed connecting pipe of the installed water closet coupling to an extent which causes the replacement connecting pipe to fit closely around the installed connecting pipe, the replacement water closet coupling also having a shoulder within the replacement connecting pipe; and (c) bonding the replacement connecting pipe of the replacement water closet coupling around the installed connecting pipe.

* * * * *